United States Patent [19]

Garwood et al.

[11] Patent Number: 4,773,987
[45] Date of Patent: Sep. 27, 1988

[54] SHAPE-SELECTIVE CONVERSION OF ORGANIC FEEDSTOCK USING CLATHRATE GROUP TECTOSILICATES

[75] Inventors: William E. Garwood, Haddonfield; John L. Schlenker, Mullica Hill, both of N.J.; James C. Vartuli, West Chester, Pa.

[73] Assignee: Mobil Oil Corporation, New York, N.Y.

[21] Appl. No.: 36,825

[22] Filed: Apr. 10, 1987

Related U.S. Application Data

[63] Continuation-in-part of Ser. No. 874,840, Jun. 13, 1986, abandoned, which is a continuation of Ser. No. 692,139, Jan. 17, 1985, abandoned.

[51] Int. Cl.$^4$ .............................................. C10G 47/02
[52] U.S. Cl. ...................................... 208/111; 208/59; 208/89; 208/97; 208/120; 585/739
[58] Field of Search ............. 208/59, 89, 97, 111 MC, 208/120; 585/739

[56] References Cited

U.S. PATENT DOCUMENTS

| | | | |
|---|---|---|---|
| 3,400,072 | 9/1968 | Tung et al. | 208/120 |
| 3,575,846 | 4/1971 | Hamner et al. | 208/111 |
| 3,591,488 | 9/1971 | Eberly, Jr. et al. | 208/111 |
| 3,647,681 | 3/1972 | Egan | 208/111 |
| 3,755,145 | 8/1973 | Orkin | 208/111 MC |
| 3,758,403 | 9/1973 | Rosinski et al. | 208/111 MC |
| 3,764,520 | 10/1973 | Kimberlin, Jr. et al. | 208/111 MC |
| 3,769,202 | 10/1973 | Plank et al. | 208/111 MC |
| 3,804,747 | 4/1974 | Kimberlin, Jr. et al. | 208/111 MC |
| 3,836,454 | 9/1974 | Hansford | 208/111 MC |
| 3,864,283 | 2/1975 | Schutt | 208/111 MC |
| 3,925,197 | 12/1975 | Van Klinken et al. | 208/216 |
| 4,001,106 | 1/1977 | Plank et al. | 208/111 MC |
| 4,137,148 | 1/1979 | Gillespie et al. | 208/87 |
| 4,259,306 | 3/1981 | Perline | 423/325 |
| 4,283,271 | 8/1981 | Garwood et al. | 208/59 |
| 4,287,166 | 9/1981 | Dwyer et al. | 423/326 |
| 4,347,121 | 8/1982 | Mayer et al. | 208/59 |
| 4,357,233 | 11/1982 | Dwyer et al. | 208/109 |
| 4,363,719 | 12/1982 | Bousquet et al. | 208/111 MC |
| 4,372,839 | 2/1983 | Oleck et al. | 208/111 MC |
| 4,395,327 | 7/1983 | Pelrine | 208/254 H |
| 4,434,047 | 2/1984 | Hensley, Jr. et al. | 210/110 |
| 4,437,976 | 3/1984 | Oleck et al. | 208/97 |
| 4,513,090 | 4/1985 | Eberly, Jr. et al. | 208/111 MC |
| 4,517,073 | 5/1985 | Ward et al. | 208/111 MC |
| 4,517,074 | 5/1985 | Ward | 208/111 MC |
| 4,550,218 | 10/1985 | Chu | 208/120 |
| 4,554,065 | 11/1985 | Albinson et al. | 585/739 |
| 4,562,166 | 12/1985 | Valyocsik | 423/329 T |
| 4,575,416 | 3/1986 | Chester et al. | 208/111 MC |
| 4,576,711 | 3/1986 | Ward et al. | 208/111 MC |
| 4,601,993 | 7/1986 | Chu et al. | 208/111 MC |
| 4,608,355 | 8/1986 | Chu | 502/71 |
| 4,636,299 | 1/1987 | Unmuth et al. | 208/87 |

OTHER PUBLICATIONS

*Synthesis and Some Properties of Two or More Zeolites, K-21 K-22*, Parker et al, "8 Zeolites", 1983, vol. 3, Jan., pp. 8–10.

*Zeolites and Clathrates—Two Distinct Classes of Framework Silicates*, Liebau, "Zeolites", 1983, vol. 3, Jul., pp. 191–193.

*ZSM-39: Its Preparation and Some Properties*, Bibby et al., "Zeolites", 1983, vol. 3, Jan., pp. 11 & 12.

*Zeolite Synthesis in the System Pyrrolidine—$Na_2O$—$Al_2O_3$—$SiO_2$—$H_2O$*, Suzuki et al, 290, "Zeolites", 1986, vol. 6, Jul., (pp. 290–298).

McMullan & Jeffrey, "Hydrates of the Tetra n-Butyl and Tetra i-Amyl Quaternary Ammonium Salts: *J. Chem. Phy.*, vol. 31, No. 5, 1959, pp. 1231–1234.

*Zeolites: Science and Technology*, Martinus Nijhoff Publishers, 1984, pp. 347–371.

*Hydrothermal Chemistry of Zeolites*, Academic Press, 1982, pp. 8–11, 40–42, 252–263 and 302–305.

*Primary Examiner*—H. M. S. Sneed
*Assistant Examiner*—Helane Myers
*Attorney, Agent, or Firm*—Alexander J. McKillop; Michael G. Gilman; Laurence P. Hobbes

[57] ABSTRACT

This invention relates to an efficient process for shape-selective conversion of organic feedstock with a catalyst comprising a Clathrate Group tectosilicate such as ZSM-39 and a highly siliceous, shape selective zeolite such as ZSM-5. In one embodiment, a stabilized, dewaxed lube stock is prepared by catalytically dewaxing a hydrocrackate.

24 Claims, 3 Drawing Sheets

PROCESS FLOW DIAGRAM

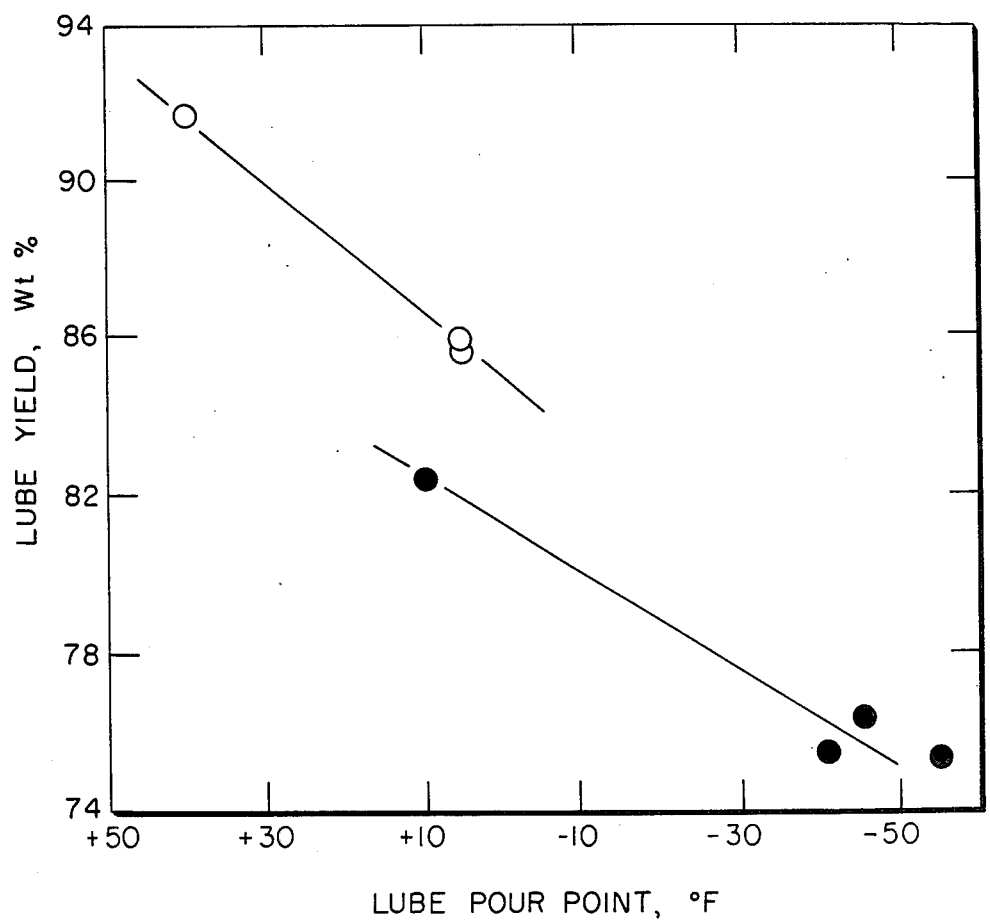

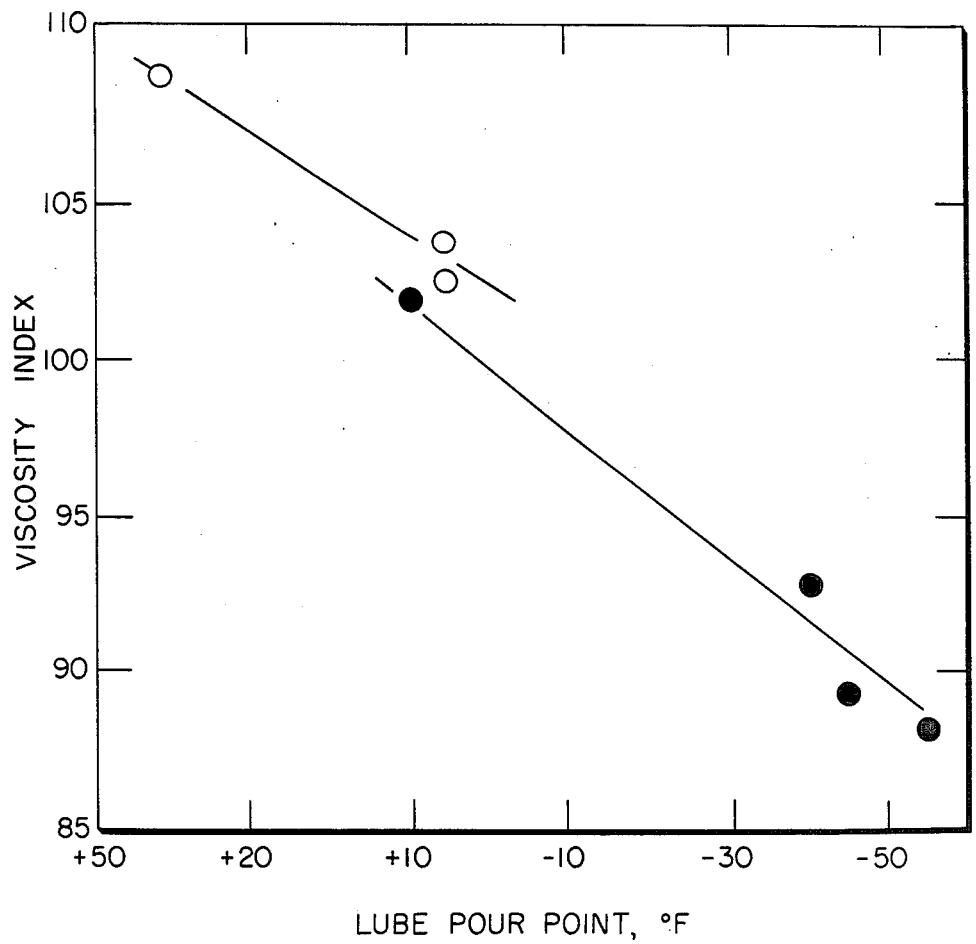

SHAPE-SELECTIVE CONVERSION OF ORGANIC FEEDSTOCK USING CLATHRATE GROUP TECTOSILICATES

This case is a continuation in part of U.S. application Ser. No. 874,840, filed June 13, 1986 now abandoned, which is a continuation of U.S. application Ser. No. 692,139 filed Jan. 17, 1985 now abandoned.

This invention relates to a process for shape-selective conversion of organic feedstocks. In particular, it relates to a specific hydrocrackate dewaxing process whereby a hydrocracked lube oil of enhanced viscosity index and low pour point is produced in high yields.

Refining suitable petroleum crude oils to obtain a variety of lubricating oils which function effectively in diverse environments has become a highly developed and complex art. Although the broad principles involved in refining are qualitatively understood, the art is encumbered by quantitative uncertainties which require considerable resort to empiricism in practical refining. Underlying these quantitative uncertainties is the complexity of the molecular constitution of lubricating oils. Because lubricating oils for the most part are based on petroleum fractions boiling above about 230° C. (450° F.), the molecular weight of the hydrocarbon constituents is high and these constituents display almost all conceivable structures and structure types. This complexity and its consequences are referred to in "Petroleum Refinery Engineering", by W. L. Nelson, McGraw Hill Book Company, Inc., New York, N.Y., 1958 (Fourth Edition), relevant portions of this text being incorporated herein by reference for background.

In general, the basic notion in lubricant refining is that a suitable crude oil, as shown by experience or by assay, contains a quantity of lubricant stock having a predetermined set of properties such as, for example, appropriate viscosity, oxidation stability, and maintenance of fluidity at low temperatures. The process of refining to isolate that lubricant stock consists of a set of subtractive unit operations which remove the unwanted components. The most important of these unit operations include distillation, solvent refining, and dewaxing, which basically are physical separation processes in the sense that if all the separated functions were recombined one would reconstitute the crude oil.

Unfortunately, crude oils suitable for the manufacture of lubes are becoming less available due to exhaustion of reserves, and the reliability of a steady, adequate supply from a known source is a matter of concern.

The desirability of upgrading a crude fraction normally considered unsuitable for lubricant manufacture to one from which good yields of lubes can be obtained has long been recognized. The so-called "hydrocracking process", sometimes referred to in the art as "severe hydrotreating", has been proposed to accomplish such upgrading. In this process, a suitable fraction of a poor grade crude, such as a California crude, is catalytically reacted with hydrogen under pressure. The process is complex in that some of the oil is reduced in molecular weight and made unsuitable for lubes, but concurrently a substantial fraction of the polynuclear aromatics is hydrogenated to form naphthenes and paraffins. Process conditions and choice of catalyst are selected to provide an optimal conversion of the polynuclear aromatic content of the stock, since this component degrades the viscosity index and stability of the stock. Also, in the hydrocracking process, paraffins can be isomerized, imparting good viscosity index characteristics to the final lube product. Another proposed upgrading process involves solvent refining.

Hydrocracked lube stocks, however, tend to be unstable in the presence of air when exposed to sunlight. On such exposure, a sludge is formed, sometimes very rapidly and in fairly substantial amount. This tendency in a lubricating oil is unacceptable. Additionally, some hydrocracked lube oils tend to darken or to form a haze.

Several methods have been proposed to correct the above-described instability. U.S. Pat. No. 4,031,016 proposes to add certain antioxidants to the hydrocracked oil. A second proposed approach is to hydrotreat a hydrocrackate. Variants of this approach are described in U.S. Pat. No. 3,666,657 which teaches a sulfided mixture of an iron group metal and a Group VI metal for a subsequent hydrotreating stage; U.S. Pat. No. 3,530,061 which utilizes a hydrotreating catalyst having one or more elements from Group IIB, VIB and VIII at hydrogen pressure up to about 100 psig; and U.S. Pat. No. 4,162,962 which teaches hydrotreating a hydrocrackate at a temperature in the 200° C. to 300° C. range with a catalyst of prescribed pore size. U.S. Pat. No. 3,530,061 teaches a non-cracking support for a subsequent hydrotreating stage. U.S. Pat. No. 3,852,207 teaches hydrotreating with a noble metal hydrogenation component supported on an oxide. The patents cited above are believed representative of the state of the art, and each is incorporated herein by reference.

Hydrocracked lubricating oils generally have an unacceptably high pour point and require dewaxing. Solvent dewaxing is a well-known and effective process but expensive. More recently catalytic methods for dewaxing have been proposed. U.S. Pat. No. Re. 28,398 describes a catalytic dewaxing process wherein a particular crystalline zeolite is used. To obtain lubricants and specialty oils with outstanding resistance to oxidation, it is often necessary to hydrotreat the oil after catalytic dewaxing, as illustrated by U.S. Pat. No. 4,137,148. U.S. Pat. Nos. 4,283,271 and 4,283,272 teach continuous processes for producing dewaxed lubricating oil base stock including hydrocracking a hydrocarbon feedstock, catalytically dewaxing the hydrocrackate and hydrotreating the dewaxed hydrocrackate. Both latter patents, recognized as advances in the art, teach use of catalyst comprising zeolite ZSM-5 or ZSM-11 for the dewaxing phase. U.S. Pat. No. 4,259,174 teaches dewaxing of a lubricating oil stock having certain characteristics over acatalyst comprising synthetic offretite. U.S. Pat. Nos. 4,222,855 and 4,372,839 teach catalytic dewaxing processes for waxy hydrocarbon feedstocks over various catalysts exhibiting specified properties, including a catalyst comprising zeolite ZSM-23. U.S. Pat. No. 4,414,097 discloses a method for dewaxing a lube hydrocrackate with ZSM-23, while Ser. No. 526,853, filed Aug. 26, 1983 now abandoned teaches dewaxing of a solvent refined feed with ZSM-23. The foregoing patents and applications indicate hhe state of the dewaxing art and are incorporated herein by reference as background.

It is inferentially evident from the foregoing background material that the manufacture of modern high quality lubricants in general requires that the crude be treated in a sequence of fairly complex and costly steps. It is further evident that there is a need for processes which can efficiently provide such lubricants from interchangeable and readily available low grade crudes.

Clathrates have been recently defined as a group of tectosilicates. See, *Hydrothermal Chemistry of Zeolites,* R. M. Barrer, Academic Press, London (1982). Members of this group are characterized by a structure analogous to gas hydrates (water-clathrates) wherein the oxygens linking non-oxygen framework atoms (T-atoms) in a tectosilicate framework structure are analogized to the hydrogen bonds linking oxygens in the gas hydrates. Members of this group include the mineral, melanophlogite as well as dodecasils such as ZSM-39 which typically consist of cages comprising pentagonal rings. Dodecasils, which have a dodecahedral host lattice, are further described in *Angew, Chem. Int. Ed. Engl.,* 21 (1982) No. 3 at pp. 206-207, incorporated herein by reference. ZSM-39 is described in U.S. Pat. Nos. 4,259,306 and 4,287,166, incorporated herein by reference as well as in *Zeolites,* Vol. 4, No. 2, April 1984, "High resolution Si n.m.r. spectroscopy of ZSM-39", J. B. Higgins et al., pp. 112 and 113, and *Nature,* Vol. 294, No. 5839, Nov. 26, 1981, "Crystal structure of a synthetic high silica zeolite—ZSM-39", Schlenker, et al., pp. 340-342, all of which are incorporated herein by reference. For the purpose of the present invention, the term "clathrate" is equivalent to the term "Clathrate Group tectosilicate".

The clathrates exhibit very limited sorptive and exchange properties, probably owing to their being made up of rings having no more than 6 members. Accordingly, although certain species may contain relatively large hexakaidecahedral or icosahedral cages, sorption of even small molecules is limited because entry into the interior large cages is restricted by the 5- and/or 6-membered rings which make up such cages. Furthermore, the clathrates are characterized by relatively low surface area.

In view of these properties, clathrates are not expected to be of significant utility for use in shape-selective organic conversion processes. ZSM-39 has been disclosed as a catalyst component in the hydrotreating of lubricant base stock, a non shape-selective conversion. U.S. Pat. No. 4,395,327 to Pelrine, incorporated herein by reference, discloses hydrotreating with a bifunctional catalyst having both acidic and hydrogenation-dehydrogenation functionality. ZSM-39 is utilized to provide the acidic properties as well as to act as a support for a hydrogenation-dehydrogenation component such as cobalt-molybdenum or platinum. Furthermore, U.S. Pat. No. 4,357,233 discloses processes for hydrocracking a hydrocracking charge stock and hydroisomerizing a hydrocarbon charge stock with ZSM-39 catalyst materials that contain a hydrogenation component. However, such hydrotreating processes with ZSM-39 were generally believed to occur at the surface of the zeolite in the absence of sorption by the zeolite necessary to effect shape-selective conversion of organics.

It has now been found that a catalyst which comprises a Clathrate Group tectosilicate in combination with a highly siliceous shape-selective crystalline silicate material exhibits enhanced shape-selective activity in conversion of organic feeds, particularly, organic feeds which are substantially free of sulfur and nitrogen or compounds thereof. By substantially free of sulfur and nitrogen is meant less than 0.15 weight percent sulfur, and less than 100 ppm nitrogen, preferably less than 0.1 weight percent sulfur and less than 50 ppm nitrogen, for example, less than 0.01 weight percent sulfur and less than 5 ppm nitrogen. Such shape- selective activity indicates at least some sorption of all or part of an organic molecule by the catalyst. As a result, conversion does not conform to thermodynamic equilibrium because those molecules capable of being sorbed by the catalyst are readily converted owing to the catalytic conversion activity within such materials; molecules not sorbed are less likely to undergo conversion. Moreover, the molecules formed within the catalyst must be of suitable dimension to escape therefrom. Otherwise such materials are likely to be trapped within the catalyst until converted to a product of suitable dimension.

The present invention relates to an improved process for dewaxing a hydrocrackate and further to a method for the manufacture of dewaxed lubricating oils. This invention provides a method for manufacturing lubricating oils in high yields with a low pour point and high viscosity index. The present invention may also be described as a dewaxing process for the selective cracking of straight-chain hydrocarbons and slightly branched-chain hydrocarbons from an organic feedstock which contains not only straight-chain and slightly branched hydrocarbons such as isoparaffins, but also other hydrocarbons which are less waxy, e.g. highly branched hydrocarbons. The feedstock is preferably substantially free of sulfur and nitrogen. The process comprises contacting said feedstock in the presence of a catalyst Clathrate Group tectosilicate catalyst and a highly siliceous, shape-selective crystalline inorganic oxide under organic feedstock dewaxing conditions.

Alternatively, the invention may be described as a process for producing a dewaxed lubricating oil base stock from an organic feedstock boiling above about 343° C. which contains straight chain and slightly branched chain hydrocarbons as well as compounds of different molecular shapes. The process comprises hydrocracking the feedstock in the presence of a hydrocracking catalyst at hydrocracking conditions including a temperature of from about 260° C. to about 482° C., a pressure of from about 1000 psig to about 3000 psig and a LHSV of from about 0.1 to about 5 to produce a hydrocrackate. The hydrocrackate is dewaxed in the presence of hydrogen and a dewaxing catalyst comprising a Clathrate Group tectosilicate and a highly siliceous, shape-selective zeolite at dewaxing conditions including a temperature of from about 260° C. to about 482° C., a pressure of from about 200 psig to about 3000 psig and a LHSV of from about 0.2 to about 20. Straight chain and slightly branched-chain hydrocarbons are selectively cracked thereby to produce a dewaxed hydrocrackate which is hydrotreated in the presence of a hydrotreating catalyst at hydrotreating conditions including a temperature of from about 176° C. to about 371° C., a pressure of from about 1000 psig to about 3000 psig and a LHSV of from about 0.1 to about 10.

While not wishing to be bound by theory, it is believed that clathrates might contribute shape-selective surface activity to the catalyst owing to the presence of incomplete pentagonal dodecahedral structures at the clathrate surface. As a result, the clathrate surface may contain not only 5-membered rings but rings of up to 12 members which are capable of hydrocarbon sorption.

The highly siliceous, shape-selective zeolites employed in the present catalyst in association with Clathrate group tectosilicates are ordered, porous crystalline silicates having a definite crystalline structure as determined by X-ray diffraction, within which there are a large number of small cavities which may be interconnected by a number of still smaller channels or pores. These cavities and pores are uniform in size within a specific zeolitic material. Since the dimensions of these pores are such as to accept for adsorption molecules of certain dimensions while rejecting those of large dimensions, these materials have come to be known as "molecular sieves" and are utilized in a variety of ways to take advantage of these properties.

Such molecular sieves, both natural and synthetic, include a wide variety of positive ion-containing crystalline materials such as metallosilicates. These materials can be described as a rigid three-dimensional framework of $XO_4$ and $YO_4$ wherein X is silicon and/or germanium, and Y is one or more of aluminum, gallium, iron, chromium, vanadium, molybdenum, arsenic, manganese, or boron. This framework is comprised of tetrahedra which are cross-linked by the sharing of oxygen atoms whereby the ratio of the total Y and X atoms to oxygen atoms is 1:2. The electrovalence of the tetrahedra containing aluminum is balanced by the inclusion in the crystal of a cation, for example an alkali metal or an alkaline earth metal cation. This can be expressed wherein the ratio of Y to the number of various cations, such as Ca/2, Sr/2, Na, K or Li, is equal to unity. One type of cation may be exchanged either entirely or partially with another type of cation utilizing ion exchange techniques in a conventional manner. By means of such cation exchange, it has been possible to vary the properties of a given zeolite by suitable selection of the cation. The spaces between the tetrhedra are occupied by molecules of water prior to dehydration.

The highly siliceous, shape selective zeolites utilized by the method of the present invention are members of a special class of zeolitic materials which exhibit unusual properties. These zeolites have unusually low Y atom content, i.e. X to Y mole ratios, greater than about 12, for example, high silica-alumina ratio zeolite are very active even when the X to Y mole ratio exceeds 30. The activity is surprising, since catalytic activity is generally attributed to framework Y atoms and/or cations associated with these atoms. These zeolites retain their crystallinity for long periods in spite of the presence of steam at high temperatures which induces irreversible collapse of the framework of other zeolites, e.g., of the X and A type. These zeolites, used as catalysts, generally have low coke-forming activity and therefore are conducive to long times on stream between regenerations by burning carbonaceous deposits with oxygen-containing gas such as air.

An important characteristic of the characteristic structure of this particular class of zeolites is that it provides a selective constrained access to an egress from the intracrystalline free space by virtue of having an effective pore size intermediate between the small pore Linde A and the large pore Linde X, i.e., the pore windows of the structure are of about a size such as would be provided by 10-membered rings of silicon atoms interconnected by oxygen atoms.

ZSM-5 is described in greater detail in U.S. Pat. Nos. 3,702,886 and Re. 29,948. The entire descriptions contained within those patents, particularly the X-ray diffraction pattern of therein disclosed ZSM-5, are incorporated herein by reference.

ZSM-11 is described in greater detail in U.S. Pat. No. 3,709,979. That description, and in particular the X-ray diffraction pattern of said ZSM-11, is incorporated herein by reference.

ZSM-5/ZSM-11 intermediate compositions are described in U.S. Pat. No. 4,229,424. That description, an in particular the X-ray diffraction pattern of said compositions disclosed herein, is incorporated herein by reference.

ZSM-12 is described in U.S. Pat. No. 3,832,449. That description, and in particular the X-ray diffraction pattern disclosed therein, is incorporated herein by reference.

ZSM-23 is described in U.S. Pat. No. 4,076,842. The entire content thereof, particularly the specification of the X-ray diffraction pattern of the disclosed zeolite, is incorporated herein by reference.

ZSM-35 is described in U.S. Pat. No. 4,016,245. The description of that zeolite, and particularly the X-ray diffraction pattern thereof, is incorporated herein by reference.

ZSM-38 is more particularly described in U.S. Pat. No. 4,046,859. The description of that zeolite, and particularly the specified X-ray diffraction pattern thereof, is incorporated herein by reference.

ZSM-48 is more particularly described in U.S. Pat. No. 4,234,231, the entire contents of which is incorporated herein by reference.

Particularly preferred zeolites for the purposes of the present invention are those which have high $SiO_2/X_2O_3$ mole ratios, e.g. greater than about 20 or even greater than 70 or 100.

In some instances, the highly siliceous, shape-selective metallosilicate can be present in the Clathrate Group tectosilicate as an impurity. For example, ZSM-39 prepared according to conventional methods will often contain ZSM-5 impurities in amounts of say, 1 to 5 weight percent. Such ZSM-39 is well-suited for use in the present invention without any added highly siliceous, shape-selective metallosilicate.

In general, the catalyst employed in the present invention comprises greater than about 50 weight percent Clathrate Group tectosilicate and about 0.1 to less than about 50 weight percent highly siliceous, shape-selective crystalline zeolite. The catalyst contains about 0.5 to about 20 weight percent, preferably about 1 to about 10 weight percent, say about 2 to about 5 weight percent of said zeolite. Generally, the structure selected from the group consisting of ZSM-5, ZSM-11, ZSM-5/ZSM-11, ZSM-12, ZSM-23, ZSM-38, and ZSM-48, preferably ZSM-5. The Clathrate Group tectosilicate has the structure of melanophlogite or ZSM-39, preferably ZSM-39. The present invention further relates to an improved process for dewaxing a hydrocrackate and further to a method for the manufacture of dewaxed lubricating oils. It should be noted that hydrocracked feeds are rendered substantially free of sulfur and nitrogen during hydrocracking. This invention further provides a method for manufacturing lubricating oils in high yields with a low pour point and high viscosity index.

FIG. 2 is a plot of lube product yield v. product pour point.

FIG. 3 is a plot of product viscosity index v. product pour point.

Figure 1:
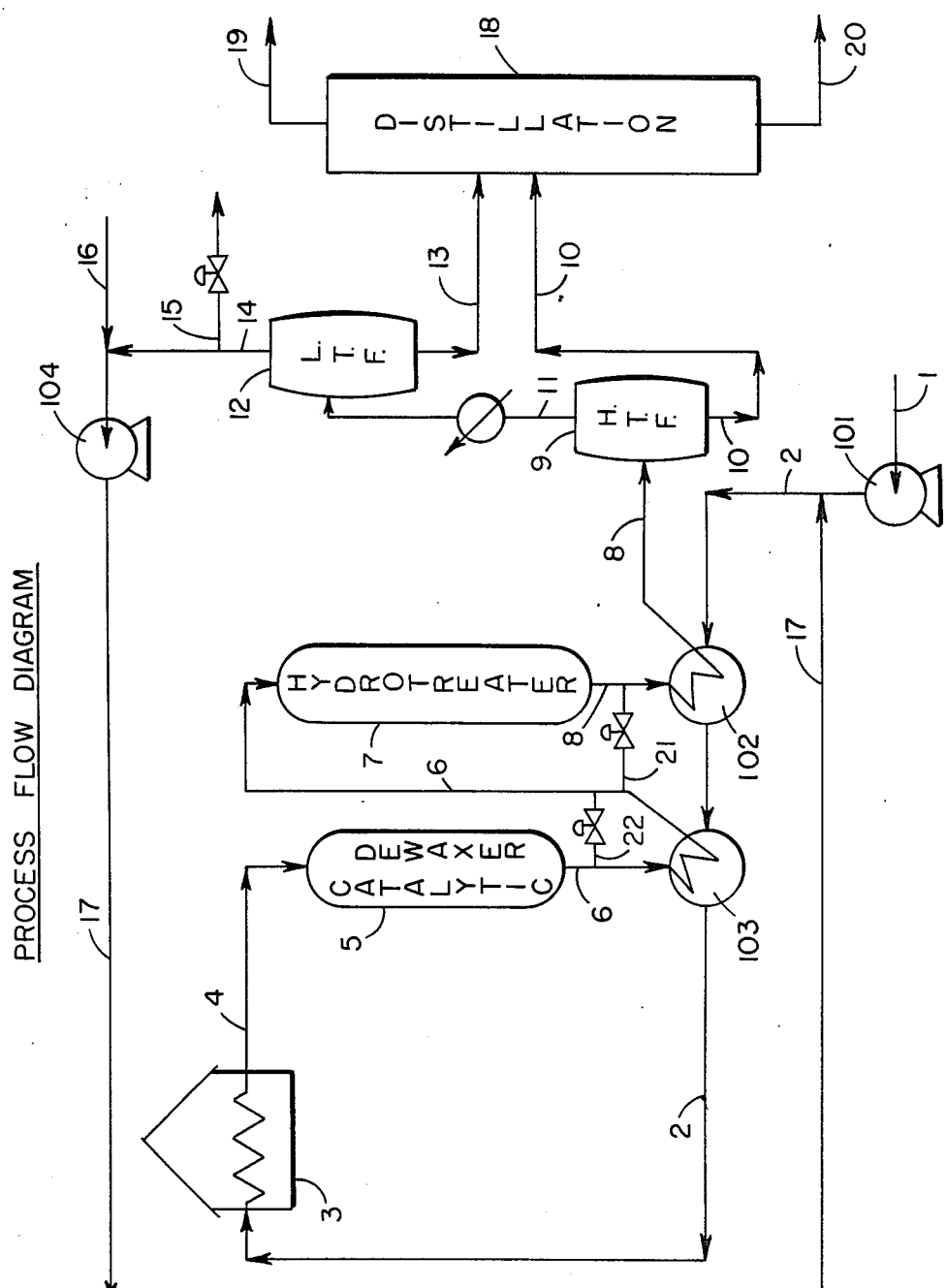
FIG. 1 is a process flow diagram illustrating an embodiment of the present invention including the relationship of process units.

This invention provides an energy-efficient process for dewaxing organic feedstocks, such as hydrocrackate and, therefore, for manufacturing a stabilized and dewaxed hydrocrackate lubricating oil stock from an organic feedstock. It further provides an energy-efficient process for dewaxing hydrocrackate and, therefore, for manufacturing a stabilized and dewaxed hydrocracked lubricating oil stock from an organic feedstock substantially free of nitrogen and sulfur, or compounds thereof, boiling above about 343° C. (650° F.), such as vacuum gas oils, and resids substantially free of asphaltenes. The process comprises passing a hydrocrackate effluent from a catalytic hydrocracking process operation through a catalytic dewaxing process operation provided with a dewaxing catalyst comprising a Clathrate Group tectosilicate such as ZSM-39 and a highly siliceous, shape-selective crystalline inorganic oxide, e.g., ZSM-5. It, therefore, further may comprise passing the feed sequentially through a hydrocracking zone, a catalytic dewaxing zone provided with a dewaxing catalyst comprising a Clathrate Group tectosilicate and a hydrotreating zone at high pressure conditions in each of said zones.

The use of catalyst comprising Clathrate Group tectosilicate and highly siliceous, shape-selective, crystalline inorganic oxide material in the dewaxing reactor of this process provides several profound advantages over the art. One advantage is that the temperature required to achieve a desired pour point is higher than that for a standard catalyst, such as, for example, a zeolite ZSM-5 catalyst, more nearly matching the temperature required for the hydrocracking reactor. This minimizes the need for quenching of hydrocrackate effluent from the hydrocracking stage of the process resulting in substantial energy saving. Also the yield of dewaxed oil is higher at comparable operating effort than the art methods. A further advantage is that the viscosity index of the dewaxed oil is higher at comparable operating effort than the art methods. An additional advantage is that the viscosity index of the dewaxed oil is higher than that obtained by the prior art methods employing zeolites such as ZSM-5 in the dewaxing stage catalyst.

An embodiment of the present process will now be illustrated by reference to FIG. 1 of the drawings.

The feed, which may be any hydrocarbon-containing organic feedstock boiling above about 343° C. (650° F.), such as a heavy neutral oil or a deasphalted residuum, is introduced via line 1 together with hydrogen via line 2 to hydrocracker section 3. Hydrocracker section 3 includes a catalytic hydrocracking zone at conditions effective to convert in a single pass at least 20% of the feed to materials boiling below the initial boiling point of said feed.

The effluent from the hydrocracker 3 including excess hydrogen may be contaminated with free hydrogen sulfide and in some cases with ammonia, since the hydrocracking step, in addition to saturating aromatic compounds, also is accompanied by desulfurization and denitrogenation. This effluent may be passed via line 4 to a high pressure gas-liquid separator 5 wherein the hydrocrackate is separated from contaminated hydrogen. The contaminated hydrogen may be passed from separator 5 via line 6 to a high pressure sorption section 7 wherein a substantial fraction of the hydrogen sulfide and ammonia are removed via line 8.

The hydrogen from sorption unit 7 may be passed via line 9 to a high pressure separator section 10 wherein it is separated from light hydrocarbons which are removed via line 11.

The hydrocrackate separated in separator section 5 is passed via line 12 to catalytic dewaxing section 13 along with makeup hydrogen introduced via line 14. Preferably, the only hydrogen supplied to the catalytic dewaxer section 13 is fresh hydrogen having a hydrogen sulfide partial pressure of less than about 5 psia and less than 100 ppm of ammonia. The amount of hydrogen supplied via line 14 may be up to about the amount consumed in the process. Thus, all of the makeup hydrogen may be supplied via line 14. Alternatively, if it is desired to supply to the catalytic dewaxer 13 less than the makeup requirement of the system, the remainder may be supplied to the hydrocracker via line 15, or at any other point in the system.

The dewaxing catalyst component, with or without a hydrogenation component, used in dewaxer 5 comprises a Clathrate Group tectosilicate, such as ZSM-39 as described above and a highly siliceous, shape-selective, crystalline inorganic oxide, e.g., ZSM-5. The hydrogenation component associated with the dewaxing catalyst may be any suitable hydrogenation component, e.g., a metal from Group VIII of the Periodic Table of Elements or a mixture of such metals alone or in combination with a metal from Group VI of the Periodic Table of Elements or a mixture thereof. Non-limiting examples of the metals from Group VIII for this purpose include platinum, palladium, iridium, ruthenium, cobalt and nickel. The Group VI metals include chromium, molybdenum and tungsten.

The effluent from the catalytic dewaxer 13, including excess hydrogen, is passed via line 16 to hydrotreater unit 17. Catalytic hydrotreater 17 contains a hydrotreating catalyst in a hydrotreating zone at stabilizing conditions. Examples of hydrotreating catalysts include, without limitation, one or more metal from Group VIII (e.g., cobalt and nickel) and Group VI (e.g., molybdenum and tungsten) of the Periodic Table of Elements supported by an inorganic oxide such as, for example, alumina or silica-alumina.

The effluent from the hydrotreater unit is passed via line 18 to a high pressure separation section 10 wherein it is treated to separate light hydrocarbons, which are removed together with a hydrogen bleed via line 11. Also separated is the hydrocarbon mixture comprising a stabilized and dewaxed hydrocracked lubricating oil stoc, which is recovered via line 19. The hydrocarbon mixture containing the lubricating oil stock is passed via line 19 to another unit for recovery of the lubricating oil stock. The makeup and recycle hydrogen separated in section 10 is passed via line 20 to compressor 21 to raise its pressure and then passed via line 2 to the hydrocracker 3.

In a preferred mode of operation of this embodiment, the pressure in line 20, which is downstream from pump 21, and the pressure in line 2, which is upstream of pump 21, do not differ by more than about 750 psig.

The embodiment shown in FIG. 1 of the process of this invention is illustrative of processing a hydrocarbon oil by the sequence of steps comprising hydrocracking, catalytic dewaxing by the present method and stabilization, in that order, with only fresh hydrogen provided to the catalytic dewaxer. It is known that hydrocracking by itself results in an unstable oil, and catalytic dewaxing in some instances also contributes to instability. By disposing the catalytic dewaxing step between the hydrocracking and stabilization step in the manner described in this embodiment, a very efficient over-all process results with the production of a stabilized and dewaxed hydrocracked lubricating oil stock.

It will be recognized by those skilled in the art that various separation steps conducted at high pressure may be advantageously incorporated in the process flow diagram of FIG. 1. For example, a high pressure separation unit may be located in line 12 or line 16, for example, to remove a low molecular weight fraction of hydrocarbon not suitable for inclusion in the final lubricant base stock, thereby reducing the hydrocarbon load to subsequent sections.

The reaction conditions for the catalytic process steps herein described are summarized in Table 1.

TABLE I

|  | Hydro-cracking | Dewaxing | Hydro-treating |
|---|---|---|---|
| Pressure, broad, psig | 1000–3000 | 200–3000 | 1000–3000 |
| Pressure, preferred, psig | 1500–2500 | 1500–2500 | 1500–2500 |
| Temperature, broad, °C. | 260–482 | 260–482 | 176–371 |
| Temperature, preferred, °C. | 343–427 | 343–427 | 204–316 |
| LHSV,* broad | 0.1–5 | 0.2–20 | 0.1–10 |
| LHSV, preferred | 0.5–2 | 0.5–5 | 0.2–3 |
| H$_2$ gas, SCF/bbl, broad | 1000–20,000 | 500–20,000 | 500–20,000 |
| H$_2$ gas, SCF/bbl, preferred | 2000–10,000 | 500–3000 | 500–3000 |

*LHSV = liquid hourly space velocity, i.e. volumes of feed per volume of catalyst per hour A wide variety of hydrocracking catalysts are contemplated as suitable for use in the process of this invention. Such catalysts in general possess an acid function and a hydrogenation function, exemplified by a porous acidic oxide such as a silica-alumina or silica zirconia associated with a nickel-tungsten or palladium or platinum, or cobalt-molybdenum or nickel-molybdenum component. In general, a Group VIII metal or a combination of a Group VI and a Group VIII metal, as the oxides or sulfides thereof, deposited on silica alumina or silica zirconia, may serve as hydrocracking catalyst. The hydrocracking itself may be conducted in two or more stages, with pretreatment of the raw feed as part of the first stage. Catalysts suitable for the dewaxing and hydrotreating steps have been described above.

The Clathrate Group tectosilicate and highly siliceous, shape-selective, crystalline inorganic oxide dewaxing catalyst and components may be associated with a matrix or binder component comprising a material resistant to the temperature and other process conditions.

Useful matrix materials include both synthetic and naturally occurring substances, as well as inorganic materials such as clay, silica and/or metal oxides. The latter may be either naturally occurring or in the form of gelatinous precipitates or gels including mixtures of silica and metal oxides. Naturally occurring clays which can be composited with the zeolite include those of the montmorillonite and kaolin families, which families include the sub-bentonites and the kaolins commonly known as Dixie, McNamee, Georgia and Florida clays or others in which the main mineral constituent is halloysite, kaolinite, dickite, nacrite or anauxite. Such clays can be used in the raw state as originally mined or initially subjected to calcination, acid treatment or chemical modification.

In addition to the foregoing materials, the catalyst employed herein may be associated with a porous matrix material such as alumina, silica-alumina, silica-magnesia, silica-zirconia, silica-thoria, silica-beryllia, silica-titania as well as ternary compositions such as silica-alumina-thoria, silica-alumina-zirconia, silica-alumina-magnesia and silica-magnesia-zirconia. The matrix can be in the form of a cogel. The relative proportions of catalyst component (Clathrate Group tectosilicate component and highly siliceous, shape-selective metallosilicate) and inorganic oxide gel matrix, on an anhydrous basis, may vary widely with the catalyst component ranging from between about 1 to about 99 percent by weight and more usually in the range of about 5 to about 80 percent by weight of the dry composite.

The above-defined hydrogenation component associated with the dewaxing catalyst may be on the catalyst component as above-noted or on the matrix component or both such that the hydrogenation component comprises about 0.1 to 10 wt. percent, preferably about 0.2 to 2 wt. percent of the bound or unbound catalyst.

In order to more fully illustrate the nature of the present invention, the improvement over the art attainable thereby and the manner of practicing the same, the following examples are presented.

EXAMPLE 1

0.5 Wt. % Pt/ZSM-39/ZSM-5 Catalyst Preparation

A sample of ZSM-39 containing about 2 weight percent ZSM-5 as determined by synchotron X-ray powder diffraction patterns (cyclohexane sorption 0.3 wt. %, n-hexane 0.4 wt. %) was mixed with alpha-alumina hydrate to make a mixture of 65 parts (by weight) impure ZSM-39 sample and 35 parts alumina. Enough water was added to the mixture so that the resulting catalyst could be formed into 1/16" extrudates. These extrudates were activated by first calcining in nitrogen at 1000° F., followed by aqueous exchanges with a 1.0N ammonium nitrate solution and finally calcining in air at 1000° F.

The extrudate was impregnated with H$_2$PtCl$_6$, dried and calcined in air at 900° F. for 3 hours. The final catalyst contained 0.53 wt. % Pt and had an alpha value of 23.

EXAMPLE 2

Hydrocracked Lube Process over 0.5 Wt. % Pt/ZSM-39/ZSM-5

The charge stock in this example was a hydrocracked lube having the following properties:

| Gravity, °API | 39.1 |
|---|---|
| Specific | 0.8660 |
| Pour Point, °F. | +90 |
| KV @ 100° C., cs | 5.02 |
| Boiling Range, °F. (D-86) | |
| IBP | 631 |
| 5 | 698 |
| 10 | 719 |
| 30 | 777 |
| 50 | 824 |
| 70 | 872 |
| 80 | 912 |
| 90 | — |
| Hydrogen, wt. % | 14.21 |
| Sulfur, wt. % | <0.01 |
| Nitrogen, ppm | <5 |

The catalyst from Example 1 was sized to 14/25 mesh, loaded into a 7/16" reactor of a microunit and treated in situ with flowing hydrogen at 900° F., atmospheric pressure, for 1 hour. Reaction conditions were 400 psig, 1 LHSV, 2500 SCF $H_2$/bbl, and temperature varied to get the desired pour points.

| Run No. | 1 | 2 | 3 |
|---|---|---|---|
| Avg. Catalyst Temp., °F. | 600 | 650 | 650 |
| Material Balance Hours | 18 | 22 | 22 |
| TOS Days | 0.8 | 1.7 | 2.6 |
| Liq. Pdt., wt. % H | 14.10 | 14.02 | 13.95 |
| Material Balance, wt. % | 100.4 | 99.7 | 100.6 |
| Yields, wt. % | | | |
| $C_1 + C_2$ | 0.2 | 0.1 | 0.1 |
| $C_3$ | 1.0 | 2.3 | 2.3 |
| $C_4$ | 1.4 | 2.6 | 2.8 |
| $C_5$ | 1.0 | 2.2 | 2.3 |
| $C_6$-610° F. | 4.9 | 7.1 | 6.9 |
| 610° F. + Lube | 91.6 | 85.7 | 85.5 |
| $H_2$ Cons., SCF/bbl | −15 | −35 | −70 |
| Lube Properties | | | |
| Gravity, °API | 32.3 | 31.1 | 31.1 |
| Specific | 0.8639 | 0.8702 | 0.8702 |
| Pour Point, °F. | +40 | +5 | +5 |
| KV @ 40° C., cs | 29.31 | 30.34 | 30.18 |
| KV @ 100° C., cs | 5.22 | 5.23 | 5.23 |
| Viscosity Index | 108.8 | 102.4 | 103.5 |

EXAMPLE 3

Hydrocracked Lube Processed Over 0.5 Wt. % Pt/ZSM-5

ZSM-5 extrudate of 0.02 to 0.05 micron crystal size bound with 35 weight percent alumina and containing 0.5 weight percent paltinum was empolyed as dewaxing catalyst under the same conditions as Example 2.

| Run No. | 1 | 2 | 3 | 4 |
|---|---|---|---|---|
| Avg. Catalyst Temp., °F. | 526 | 525 | 500 | 476 |
| Material Balance Hours | 17.5 | 23 | 22.5 | 22.5 |
| TOS Days | 0.7 | 1.7 | 1.6 | 3.5 |
| Liq. Pdt., wt. % H | 13.85 | 14.01 | 13.97 | 13.92 |
| Material Balance, wt. % | 97.1 | 95.6 | 104.5 | 103.6 |
| Yields, wt. % (NLB) | | | | |
| $C_1 + C_2$ | 0.2 | 0.2 | 0.2 | 0.1 |
| $C_3$ | 4.7 | 3.6 | 3.4 | 2.2 |
| $C_4$ | 10.8 | 8.7 | 10.1 | 6.0 |
| $C_5$ | 5.1 | 4.9 | 6.4 | 3.5 |
| $C_6$-610° F. | 4.8 | 6.8 | 5.1 | 6.0 |
| 610° F. + Lube | 75.0 | 76.1 | 75.2 | 82.2 |
| $H_2$ Cons., SCF/bbl | 155 | 165 | 180 | 10 |
| Lube Properties | | | | |
| Gravity, °API | 29.2 | 29.6 | 30.0 | 30.5 |
| Specific | 0.8805 | 0.8873 | 0.8762 | 0.8735 |
| Pour Point, °F. | −55 | −45 | −40 | +10 |
| KV @ 40° C., cs | 38.48 | 38.37 | 36.49 | 33.04 |
| KV @ 100° C., cs | 5.80 | 5.81 | 5.69 | 5.50 |
| Viscosity Index | 87.7 | 88.9 | 92.4 | 101.7 |

The plots of FIGS. 2 and 3 show that the 0.5% Pt (ZSM-39 of Example 2) makes both a higher lube yield and higher viscosity index compared to 0.5% Pt/ZSM-5 at the same pour point.

EXAMPLE 4

Hydrocracked Lube Processed Over 1.7 Wt. % Pt/$Al_2O_3$

The catalyst treatment and reaction conditions were the same as in Examples 2 and 3. Results were as follows:

| Run No. | 1 | 2 |
|---|---|---|
| Av. Cat. Temp., °F. | 600 | 649 |
| Mat. Bal., Hours | 22 | 22 |
| TOS, Days | 0.9 | 1.8 |
| Liq. Pdt., Wt. % H | 14.18 | 13.95 |
| Mat. Bal., Wt. % | 101.2 | 102.1 |
| Yields, Wt. % (NLB) | | |
| $C_1 + C_2$ | <0.1 | <0.1 |
| $C_3$ | <0.1 | 0.2 |
| $C_4$ | 0.1 | 0.1 |
| $C_5$ | 0.1 | 0.1 |
| $C_6$-610° F. | 0.7 | 1.9 |
| 610° F. + Lube | 99.1 | 97.5 |
| $H_2$ Cons., SCF/bbl | −20 | −170 |
| Lube Properties | | |
| Gravity, °API | 33.6 | 32.4 |
| Specific | 0.8571 | 0.8633 |
| Pour Point, °F. | +80 | +80 |
| KV @ 40° C., cs | 27.91 | 27.16 |
| KV @ 100° C., cs | 5.11 | 5.01 |
| Viscosity Index | 111.8 | 110.7 |

This example shows that alumina, when impregnated with 1.7 wt. % platinum, more than 3 times as much as that combined with ZSM-39 in Example 2, is inactive for lowering pour point. The pour point changed from +90° F. to +80° F. at both catalyst temperatures of 600° F. and 650° F., compared to +40° F. and +5° F. at the same temperatures for 0.5 wt. % Pt/ZSM-39.

EXAMPLE 5

Hydrocracked Lube Processed Over Unbound 0.5 wt % Pt ZSM-39

Unbound 0.5 weight percent PtZSM-39 was employed as catalyst under the conditions of Example 2. Results were as follows:

| Run No.: | 1 | 2 | 3 | 4 |
|---|---|---|---|---|
| Avg. Cat. Temp, °F. | 600 | 650 | 650 | 680 |
| Mat. Bal., Hours | 18½ | 22 | 22 | 22 |
| TOS, Days | 0.8 | 1.7 | 2.6 | 3.5 |
| Liq Pdt, wt %, H | 14.3 | 14.55 | 14.3 | 14.26 |
| Material Bal, wt % | 100.0 | 99.4 | 99.2 | 98.7 |
| Yield, wt % (NLB) | | | | |
| $C_1 + C_2$ | <0.1 | <0.1 | <0.1 | <0.1 |
| $C_3$ | 0.8 | 1.6 | 1.6 | 2.0 |
| $C_4$ | 1.3 | 2.0 | 2.2 | 2.7 |
| $C_5$ | 1.3 | 2.3 | 2.2 | 2.9 |
| $C_6$-610° F. | 2.0 | 3.6 | 4.1 | 4.2 |
| 610° F.+ Lube | 94.8 | 91.0 | 90.0 | 88.4 |
| $H_2$ Cons., SCF/bbl | 95 | 280 | 120 | 110 |
| Lube Properties | | | | |
| Gravity, °API | 31.3 | 31.2 | 31.3 | 30.9 |
| Specific | 0.8692 | 0.8697 | 0.8692 | 0.8713 |
| Pour Point, °F. | +70 | +35 | +25 | +15 |
| K.V. @ 40° C., cs | 32.06 | 31.11 | 30.60 | 31.66 |
| KV @ 100° C., cs | 5.54 | 5.38 | 5.34 | 5.38 |
| Viscosity Index | 109.9 | 106.6 | 107.1 | 103.1 |

Comparing these results with those of Example 2 in the case, it can be seen that in the absence of 35 wt % of $Al_2O_3$ binder the catalyst is less active but has the same selectivity as measured by yield and viscosity index.

EXAMPLE 6

Solvent Refined Lube Hydrodewaxed Over 0.5 Wt. % Pt/ZSM-39

The catalyst of Example 1 was used to hydrodewax a solvent refined light neutral stock containing substantial amounts of sulfur and nitrogen and having the following properties:

| Gravity, °API | 32.3 |
|---|---|
| Specific | 0.8639 |
| Pour Point, °F. | +95 |
| K.V. @ 100° C., cs | 4.80 |
| Hydrogen, wt % | 13.92 |
| Sulfur, wt % | 0.76 |
| Nitrogen, ppm | 19 |
| Boiling Range, °F. | |
| 1% | 653 |
| 5 | 716 |
| 10 | 738 |
| 30 | 778 |
| 50 | 805 |
| 70 | 835 |
| 90 | 888 |
| 95 | 926 |
| 98 | 973 |

The hydrodewaxing was carried out at 1 LHSV and 2500 SCF $H_2$/bbl. Results were as follows:

| Run No. | 1 | 2 | 3 | 4 | 5 | 6 |
|---|---|---|---|---|---|---|
| Pressure, psig | ←400→ | | | | ←1000→ | |
| Av. Cat. Temp, °F. | 650 | 700 | 750 | 801 | 801 | 750 |
| Mat. Bal., Hrs. | 20.5 | 22 | 22 | 20 | 19 | 22 |
| TOS, Days | 0.9 | 1.8 | 2.7 | 3.5 | 4.3 | 5.2 |
| Lube Product | | | | | | |
| Yield, wt % | ~95 | ~95 | 91.7 | 66.9 | 46.4 | 75.5 |
| Pour Point, °F. | +95 | +95 | +90 | +70 | +10 | +60 |
| K.V. @ 40° C., cs | — | — | — | 16.27 | 19.97 | 24.65 |
| K.V. @ 100° C., cs | — | — | 4.56 | 3.73 | 4.01 | 4.66 |
| Vis. Index | — | — | — | 117.8 | 95.7 | 105.2 |

The catalyst was quite inactive for hydrodewaxing this stock, requiring a temperature of 800° F. at 1000 psig pressure to lower the pour point to +10° F., lube yield was very low, indicating that shape-selective conversion was not taking place.

EXAMPLE 7

Solvent-Refined Lube Hydrodewaxed Over 2 Wt. % ZSM-5 Extrudate

A 2 weight percent Pt/ZSM-5 bound with alumina (70 weight percent) was used to hydrodewax the same solvent refined light neutral stock set out in Example 6 at 400 psig, LHSV and 2500 SCF $H_2$/bbl. The results are summarized below.

| Run No. | 1 | 2 |
|---|---|---|
| Av. Cat. Temp, °F. | 551 | 551 |
| Mat. Bal., Hrs. | 22.5 | 22.5 |
| TOS, Days | 0.9 | 1.8 |
| Lube Product | | |
| Yield, wt % | 74.2 | 74.0 |
| Pour Point, °F. | −15 | 0 |
| KV @ 40° C., cs | 35.18 | 32.38 |
| KV @ 100° C., cs | 5.475 | 5.32 |
| Viscosity Index | 86.9 | 94.5 |

The results show that this stock is easily hydrodewaxed over Pt/ZSM-5 notwithstanding the presence of significant amounts of sulfur and nitrogen in the feed.

What is claimed is:

1. A dewaxing process for the selective cracking of waxy straight-chain hydrocarbons and waxy slightly branched-chain hydrocarbons from an organic feedstock boiling above about 343° C. containing the same as well as other, less waxy, hydrocarbons, which process comprises contacting said feedstock in the presence of a catalyst containing a Clathrate Group tectosilicate and a highly siliceous, shape selective zeolite catalyst under organic feedstock dewaxing conditions, wherein said Clathrate Group tectosilicate is ZSM-39 and said catalyst comprises greater than about 50 weight percent Clathrate Group tectosilicate and about 0.1 to less than about 50 weight percent highly siliceous, shape-selective crystalline zeolite.

2. The process of claim 1 wherein said zeolite is selected from the group consisting of ZSM-5, ZSM-11, ZSM-5/ZSM-11, ZSM-12, ZSM-23, ZSM-35 and ZSM-48.

3. The process of claim 2 wherein said Clathrate Group tectosilicate is ZSM-39.

4. The process of claim 3 wherein said zeolite is ZSM-5.

5. The process of claim 3 wherein said catalyst comprises about 0.5 to about 20 weight percent of said zeolite.

6. The process of claim 3 wherein said catalyst comprises about 1 to about 10 weight percent of said zeolite.

7. The process of claim 3 wherein said catalyst comprises about 2 to 5 weight percent of said zeolite.

8. The process of claim 1 wherein said feedstock is substantially free of sulfur and nitrogen.

9. The process of claim 8 wherein said feedstock contains less than about 0.15 weight percent sulfur and less than 100 ppm nitrogen.

10. The process of claim 8 wherein said feedstock contains less than about 0.1 weight percent sulfur and less than 50 ppm nitrogen.

11. The process of claim 4 wherein said feedstock contains less than about 0.01 weight percent sulfur and less than about 5 ppm nitrogen.

12. The process of claim 8 wherein said selective cracking is carried out in the presence of hydrogen.

13. The process of claim 8 wherein said feedstock is a hydrocrackate resulting from the catalytic hydrocracking of an organic feedstock and which comprises contacting said hydrocrackate in the presence of hydrogen at a temperature of from about 260° C. to about 482° C., a pressure of from about 200 psig to about 3000 psig and a LHSV of from about 0.2 to about 20.

14. The process of claim 6 wherein said catalyst comprises a hydrogenation component.

15. The process of claim 14 wherein said hydrogenation component comprises a metal selected from the Group consisting of Group VIII elements of the Periodic Table of Elements and Group VI elements of the Periodic Table of Elements.

16. The process of claim 14 wherein said hydrogenation component is platinum.

17. A process for producing a dewaxed lubricating oil base stock from an organic feedstock boiling above about 343° C. which contains waxy straight chain and waxy slightly branched-chain hydrocarbons as well as other, less waxy, hydrocarbons which process comprises hydrocracking said feedstock in the presence of a hydrocracking catalyst at hydrocracking conditions including a temperature of from about 260° C. to about 482° C., a pressure of from about 1000 psig to about 3000 psig and a LHSV of from about 0.1 to about 5 to produce a hydrocrackate, dewaxing said hydrocrackate in the presence of hydrogen and a dewaxing catalyst comprising greater than about 50 weight percent of a Clathrate Group tectosilicate ZSM-39 and a highly siliceous, shape-selective zeolite of about 0.5 to 20 weight percent at dewaxing conditions including a temperature of from about 260° C. to about 482° C., a pressure of from about 200 psig to about 3000 psig and a Liquid Hourly Space Velocity of from about 0.2 to about 20 whereby straight chain and slightly branched-chain hydrocarbons are selectively cracked to produce a dewaxed hydrocrackate, and hydrotreating said dewaxed hydrocrackate in the presence of a hydrotreating catalyst at hydrotreating conditions including a temperature of from about 176° C. to about 371° C., a pressure of from about 1000 psig to about 3000 psig and a LHSV of from about 0.1 to about 10.

18. The process of claim 17 wherein said dewaxing catalyst a hydrogenation component.

19. The process of claim 17 wherein said hydrogenation component comprising a metal selected from Group VIII Elements of the Periodic Table of Elements and Group VI Elements of the Periodic Table of Elements.

20. The process of claim 17 wherein said hydrogenation component is platinum.

21. The process of claim 17 wherein said dewaxing catalyst comprises a binder material.

22. The process of claim 17 wherein said binder material is alumina.

23. The process of claim 17 wherein said zeolite is ZSM-5, said temperature is from about 343° C. to about 427° C., said pressure is from about 1500 psig to about 2500 psig and said Liquid Hourly Space Velocity is from about 0.5 to about 5.

24. The process of claim 17 wherein said hydrocracking conditions include a temperature of from about 343° C. to about 427° C., a pressure of from about 1500 to about 2500 psig and a Liquid Hourly Space Velocity of from about 0.5 to about 2, said dewaxing conditions including a temperature of from about 343° C. to about 427° C., a pressure of from about 1500 psig to about 2500 psig and a LHSV of from about 0.5 to about 5, and said hydrotreating conditions include a temperature of from about 204° C. to about 316° C., a pressure of from about 1500 psig to about 2500 psig and a LHSV of from about 0.2 to about 3.

* * * * *